United States Patent
Tsuda et al.

(10) Patent No.: US 8,242,235 B2
(45) Date of Patent: Aug. 14, 2012

(54) PURIFICATION PROCESS OF ELECTROLUMINESCENT MATERIAL, ELECTROLUMINESCENT MATERIAL AND ELECTROLUMINESCENT DEVICE

(75) Inventors: Yoshihiro Tsuda, Tsukuba (JP); Yoshii Morishita, Tsukuba (JP); Satoyuki Nomura, Tsukuba (JP); Seiji Tai, Hitachi (JP); Yousuke Hoshi, Tsukuba (JP); Shigeaki Funyuu, Tsuchiura (JP); Matthew L. Marrocco, III, Fontana, CA (US); Farshad J. Motamedi, Claremont, CA (US); Li-Sheng Wang, Arcadia, CA (US)

(73) Assignees: Hitachi Chemical Co., Ltd., Tokyo (JP); Maxdem Incorporated, San Dimas, CA (US)

( * ) Notice: Subject to any disclaimer, the term of this patent is extended or adjusted under 35 U.S.C. 154(b) by 1207 days.

(21) Appl. No.: 10/559,280

(22) PCT Filed: Jun. 4, 2004

(86) PCT No.: PCT/JP2004/008147
§ 371 (c)(1),
(2), (4) Date: Jun. 9, 2006

(87) PCT Pub. No.: WO2004/108800
PCT Pub. Date: Dec. 16, 2004

(65) Prior Publication Data
US 2007/0275628 A1    Nov. 29, 2007

(30) Foreign Application Priority Data

Jun. 5, 2003 (JP) ................. P2003-160762
Jun. 5, 2003 (JP) ................. P2003-160763

(51) Int. Cl.
*C08G 85/00* (2006.01)
(52) U.S. Cl. ............. 528/490; 528/496; 528/499
(58) Field of Classification Search .............. 445/59; 564/437, 438; 528/487; 526/69; 252/301.16; 428/690, 917, 487, 490, 495, 496, 499
See application file for complete search history.

(56) References Cited

U.S. PATENT DOCUMENTS

| | | | |
|---|---|---|---|
| 4,855,400 A * | 8/1989 | van Broekhoven et al. | 528/392 |
| 4,992,529 A * | 2/1991 | Hoxmeier | 528/486 |
| 5,073,621 A * | 12/1991 | Tsiang | 528/483 |
| 5,777,070 A * | 7/1998 | Inbasekaran et al. | 528/394 |
| 7,255,936 B2 | 8/2007 | Doi et al. | |
| 7,507,351 B2 | 3/2009 | Tsuda et al. | |
| 2004/0254336 A1 * | 12/2004 | Xiao et al. | 528/373 |
| 2004/0260090 A1 * | 12/2004 | Treacher et al. | 544/224 |

FOREIGN PATENT DOCUMENTS

| | | |
|---|---|---|
| CN | 1329100 | 1/2002 |
| JP | 11-171801 | 6/1999 |
| JP | 2000-327639 | 11/2000 |
| JP | 2001-316338 | 11/2001 |
| JP | 2002-80433 | 3/2002 |
| JP | 2003-155476 A | 5/2003 |
| JP | 2004-331586 A | 11/2004 |
| WO | WO90/13148 | 11/1990 |
| WO | WO00/41443 | 7/2000 |
| WO | 2004/113420 A1 | 12/2004 |

OTHER PUBLICATIONS

Zhan et al.,"New series of blue-emitting and Electron-Transporting Copolymers Based on Fluorene" Macromolecules. vol. 35, No. 7, 2002.*
Taiwanese Office Action dated Jan. 25, 2008 (mailing date), issued in corresponding Taiwanese Patent Application No. 093116080.
Chinese Office Action dated Mar. 23, 2007, Application No. 200480015574.0.
Japanese Office Action dated Jul. 8, 2010, issued in corresponding Japanese Patent Application No. 2005-506834.
Korean office Action dated Nov. 20, 2010, issued in corresponding Korean Patent Application No. 10-2005-7021855.
Igor Sokolik et al.; "Blue-light electroluminescence from $p$-phenylene vinylene-based copolymers", J. Appl. Phys., vol. 74, No. 5, Sep. 1, 1993, pp. 3584-3586.
Heather D. Maynard et al.; "Purification Technique for the Removal of Ruthenium From Olefin Metathesis Reaction Product", Tetrahedron Letters, 1999, pp. 4137-4140.

* cited by examiner

*Primary Examiner* — Anh Mai
*Assistant Examiner* — Elmito Breval
(74) *Attorney, Agent, or Firm* — Westerman, Hattori, Daniels & Adrian, LLP

(57) ABSTRACT

Objects of the present invention are to provide a purification process that enables Pd and P to be removed effectively, and to provide an electroluminescent material and an electroluminescent device obtained by employing the process. The present invention relates to a process for purifying an electroluminescent material, the process involving treating, with an oxidizing agent and then with a column, an electroluminescent material that contains Pd and/or P as impurities so as to remove the Pd and/or P.

16 Claims, No Drawings

PURIFICATION PROCESS OF ELECTROLUMINESCENT MATERIAL, ELECTROLUMINESCENT MATERIAL AND ELECTROLUMINESCENT DEVICE

TECHNICAL FIELD

The present invention relates to a purification process for an electroluminescent material, and an electroluminescent material and an electroluminescent device obtained by employing the process.

BACKGROUND ART

Electroluminescent devices have been attracting attention as, for example, large-area solid state light sources to replace incandescent lamps and gas-filled lamps. They have also been attracting attention as self-luminous displays, and are the most promising alternative to liquid crystal displays in the flat panel display (FPD) field. In particular, an organic electroluminescent (EL) device, in which the device material is formed from an organic material, is being commercialized as a low power consumption full-color FPD. Above all, polymer-based organic EL devices will be indispensable for future large-screen organic EL displays since the organic material of the polymer-based organic EL devices is formed from a polymer material for which film formation by printing, ink-jet, etc. is simple compared with low molecular weight-based organic EL devices, which require film formation in a vacuum system.

Conventionally, polymer-based organic EL devices employ either a conjugated polymer such as poly(p-phenylene-vinylene) (see e.g. International Publication WO90/13148) or a non-conjugated polymer (see e.g. I. Sokolik, et al., J. Appl. Phys. 1993. 74, 3584) as the polymer material. However, their luminescence lifetime as a device is short, which gives rise to problems when constructing a full-color display.

With the object of solving these problems, polymer-based organic EL devices employing various types of polyfluorene-based and poly(p-phenylene)-based conjugated polymers have been proposed in recent years, but they are not satisfactory in terms of stability. This is due to impurities contained in the polymer and, in particular, the presence of Pd or P.

DISCLOSURE OF INVENTION

For example, when a synthetic reaction for a material that is used as an electroluminescent material is carried out employing a Pd catalyst, the Pd and P, which is used as a ligand for the Pd catalyst, remain in the electroluminescent material after the reaction. When the Pd or P remains in the electroluminescent material, problems in terms of luminescence characteristics such as an increase in the luminescence starting voltage, a degradation in the luminescence efficiency, and a degradation in the stability easily occur. In order to solve these problems, it is necessary to purify the electroluminescent material subsequent to the reaction. With regard to a general purification process for an electroluminescent material, a soxhlet extraction method, a reprecipitation method, etc. are known. However, it is difficult to remove Pd and P by these methods.

The present invention solves the above-mentioned problems and provides a purification process that enables Pd and P to be removed effectively, and an electroluminescent material and an electroluminescent device obtained by employing the process.

That is, the present invention relates to a purification process for an electroluminescent material, the process comprising treating, with an oxidizing agent and then with a column, an electroluminescent material that contains Pd and/or P as impurities so as to remove the Pd and/or P Furthermore, the present invention relates to the purification process for an electroluminescent material, wherein the electroluminescent material is synthesized using a Pd catalyst.

Moreover, the present invention relates to the purification process for an electroluminescent material, wherein the electroluminescent material is a polymer or an oligomer.

Furthermore, the present invention relates to the purification process for an electroluminescent material, wherein the electroluminescent material is a conjugated polymer or oligomer.

Moreover, the present invention relates to an electroluminescent material that is purified by the purification process.

Furthermore, the present invention relates to the electroluminescent material, wherein the Pd and P concentrations are each equal to or less than 100 ppm.

Moreover, the present invention relates to an electroluminescent device obtained by employing the electroluminescent material.

The disclosures of the present invention relate to subject matter described in Japanese Patent Application Nos. 2003-160762 and 2003-160763 filed on Jun. 5, 2003, and the disclosures therein are incorporated herein by reference.

BEST MODE FOR CARRYING OUT THE INVENTION

Modes for carrying out the present invention are explained in detail below.

The purification process of the present invention comprises treating, with an oxidizing agent and then with a column, an electroluminescent material that contains Pd and/or P as impurities so as to remove the Pd and/or P. The treatment method with the oxidizing agent is not particularly limited, and in the present invention a method in which a solution of an electroluminescent material and an oxidizing agent solution that is immiscible with the above-mentioned solution are mixed so as to wash the solution of the electroluminescent material with the oxidizing agent solution is preferably used.

As a preferred embodiment, firstly, an electroluminescent material solution is obtained by dissolving in an appropriate solvent an electroluminescent material that contains Pd and/or P as impurities. Any solvent can be used as long as it dissolves the electroluminescent material, does not react with the oxidizing agent, and is immiscible with water, and preferred examples thereof include dichloromethane, chloroform, toluene, xylene, and a mixed solvent thereof. The concentration of the electroluminescent material dissolved therein is preferably set in the range of 0.01 to 10 parts by weight relative to 100 parts by weight of the solvent, and more preferably 0.1 to 5 parts by weight. The dissolution temperature is preferably set at 10° C. or higher but not more than the boiling point of the solvent used. The electroluminescent material solution thus obtained may be filtered as necessary to remove undissolved material.

The electroluminescent material solution thus obtained is subsequently treated with an oxidizing agent. Specifically, for example, the electroluminescent material solution is washed by adding a dilute aqueous solution of the oxidizing agent thereto a number of times, and preferably once to five times, while taking into consideration the yield, the number of steps, and the Pd concentration after purification. Washing may be carried out by a standard solution washing method and, for example, a separatory funnel can used. The concentration of the oxidizing agent in the aqueous solution of the oxidizing agent is preferably set in the range of 0.01 to 20 wt %, and more preferably 0.1 to 10 wt %. Furthermore, the aqueous solution of the oxidizing agent is usually used at a ratio by volume of 1:10 to 10:1 relative to the electroluminescent material solution. In the present invention, after washing with the aqueous solution of the oxidizing agent, washing with water may be carried out a number of times, and preferably once to five times.

It is surmised that the polarity of the Pd and/or P contained in the electroluminescent material is changed by the present treatment, and separation and removal become possible in the subsequent treatment with a column.

The organic solvent layer is subsequently extracted and concentrated by a rotary evaporator, etc., and the solvent is removed so as to give a solid (electroluminescent material). The solid (electroluminescent material) thus obtained is dissolved in a small amount of solvent, and passed through a column. The eluate (electroluminescent material solution) is concentrated by an evaporator, etc. so as to remove the solvent. When the purified electroluminescent material is in the form of a syrup, it is difficult to dry even by vacuum drying, and the solvent tends to remain. The syrup-form electroluminescent material may therefore be dissolved again in a solvent that can dissolve it, and the solution thus obtained is then added dropwise, while stirring, to a solvent that makes the electroluminescent material precipitate, thus precipitating the target electroluminescent material in the form of fibers. With regard to solvents that dissolve the electroluminescent material, those described above can be used, and with regard to solvents that make the electroluminescent material precipitate, acetone, methanol, ethanol, ethyl acetate, ether, hexane, a mixed solvent thereof, etc. can be cited.

Moreover, the purification process of the present invention may include any other steps.

Any oxidizing agent may be used as long as it does not react with the electroluminescent material, and those that are water soluble are preferable. Examples of the oxidizing agent include peroxides and peroxo acids (salts), but they should not be construed as being limiting thereto. Specifically, hydrogen peroxide, OXONE (product name, persulfate mixture, manufactured by E.I. du Pont de Nemours & Company), peracetic acid, etc. is preferably used.

With regard to a packing for column chromatography, silica gel, alumina, zirconia, titania, etc. can be cited as examples, but they should not be construed as being limiting thereto.

In the present invention, any electroluminescent material may be used as long as Pd and P are contained as impurities; in particular, it is preferable to use an electroluminescent material synthesized using a Pd catalyst, and it is more preferable to use an electroluminescent material synthesized using a Pd catalyst having a P-containing compound as a ligand. Examples of the P-containing compound include triphenylphosphine, tri-tert-butylphosphine, tri-o-tolylphosphine, 1,2-bis(diphenylphosphino)ethane), 1,1'-bis(diphenylphosphino) ferrocene, and triethylphosphite.

The Pd catalyst may be a Pd (0) complex or a Pd (II) salt. Examples of the Pd catalyst include tetrakis(triphenylphosphine) palladium, tetrakis(tri-tert-butylphosphine) palladium, dichlorobis(triphenylphosphine) palladium, dichlorobis(tri-tert-butylphosphine) palladium, [1,1'-bis(diphenylphosphino) ferrocene] palladium (II) chloride, tetrakis(tri-o-tolylphosphine) palladium, tetrakis(tri-t-butylphosphine) palladium, bis(1,2-bis(diphenylphosphino) ethane) palladium, bis(1,1'-bis(diphenylphosphino)ferrocene) palladium, and tetrakis(triethylphosphite) palladium.

With regard to a method for synthesizing an electroluminescent material using a Pd catalyst, there are the Heck reaction in which an aryl halide or a vinyl halide is reacted with a terminal olefin to give a substituted olefin, the Sonogashira coupling reaction in which an aryl halide or a haloalkane is reacted with a terminal acetylene to give a disubstituted acetylene, the Stille coupling reaction in which an aryl halide or a vinyl halide is reacted with an organotin compound, the Suzuki coupling reaction in which an aryl halide or a vinyl halide is reacted with a boron compound, etc., but they should not be construed as being limiting thereto. In the present invention, it is preferable to use an electroluminescent material synthesized by the Suzuki coupling reaction.

In the present invention, the electroluminescent material is preferably a polymer or an oligomer, and more preferably a conjugated polymer or oligomer. Furthermore, the weight-average molecular weight of the electroluminescent material is preferably 1,000 or greater, more preferably 10,000 or greater, and yet more preferably 100,000 or greater, and in order for the viscosity when dissolved in a solvent to be such that it is possible to stir, the weight-average molecular weight is preferably no more than 1,000,000.

The term 'conjugated polymer' referred to in the present invention means either a completely conjugated polymer, that is, a polymer that is conjugated throughout the length of its polymer chain, or a partially conjugated polymer, that is, a polymer that includes both a conjugated part and a nonconjugated part. The same applies to the term 'conjugated oligomer'.

Specific examples of the electroluminescent material include polymers and oligomers containing, as a main backbone, a poly(arylene) such as polyphenylene, polyfluorene, polyphenanthrene, or polypyrene, or a derivative thereof; a poly(heteroarylene) such as polythiophene, polyquinoline, or polycarbazole, or a derivative thereof; a poly(arylenevinylene), or a derivative thereof; a poly(aryleneethynylene), or a derivative thereof; and polymers and oligomers having, as a unit (that is, not limited to a structure in the main backbone and may be a side chain structure), a structure of benzene, naphthalene, anthracene, phenanthrene, chrysene, rubrene, pyrene, perylene, indene, azulene, adamantane, fluorene, fluorenone, dibenzofuran, carbazole, dibenzothiophene, furan, pyrrole, pyrroline, pyrrolidine, thiophene, dioxolane, pyrazole, pyrazoline, pyrazolidine, imidazole, oxazole, thiazole, oxadiazole, triazole, thiadiazole, pyran, pyridine, piperidine, dioxane, morpholine, pyridazine, pyrimidine, pyrazine, piperazine, triazine, trithiane, norbornene, benzofuran, indole, benzothiophene, benzimidazole, benzoxazole, benzothiazole, benzothiadiazole, benzoxadiazole, purine, quinoline, isoquinoline, coumarin, cinnoline, quinoxaline, acridine, phenanthroline, phenothiazine, flavone, triphenylamine; acetylacetone, dibenzoylmethane, picolinic acid, silole, porphyrin, or a coordination compound of a metal such as iridium; or a derivative thereof. It is also possible to employ a low molecular weight compound having these backbones.

In the present invention, it is preferable to employ a polymer or an oligomer containing as the main backbone a poly(arylene), a derivative thereof, a poly(heteroarylene), or a derivative thereof. It is also preferable to employ a polymer or an oligomer containing as the unit of benzene, naphthalene, anthracene, phenanthrene, pyrene, fluorene, dibenzofuran, carbazole, dibenzothiophene, furan, thiophene, oxadiazole, triazole, thiadiazole, pyridine, triazine, benzothiophene, benzimidazole, benzoxazole, benzothiazole, benzothiadiazole, benzoxadiazole, quinoline, isoquinoline, acridine, phenanthroline, triphenylamine, acetylacetone, dibenzoylmethane, or a coordination compound of a metal such as iridium; or a derivative thereof.

It is preferable for the electroluminescent material purified by the purification process of the present invention to have a Pd content of 100 ppm or less and a P content of 100 ppm or less, and more preferably a Pd content of 50 ppm or less and a P content of 50 ppm or less.

It is preferable for the electroluminescent material purified by the purification process of the present invention to have a Pd content of 100 ppm or less, and more preferably 50 ppm or less.

The general structure of an electroluminescent device employing the electroluminescent material obtained by the purification process of the present invention is not particularly limited, and is described in, for example, U.S. Pat. Nos. 4,539,507 and 5,151,629. A polymer-containing electroluminescent device is described in, for example, International Patent Application WO90/13148 and EP-A-0443861.

These electroluminescent devices usually include an electroluminescent layer (light-emitting layer) between cathode and anode electrodes, at least one of which is transparent. Furthermore, at least one electron injection layer and/or electron transporting layer is inserted between the electroluminescent layer (light-emitting layer) and the cathode and, moreover, at least one positive hole injection layer and/or positive hole transporting layer is inserted between the electroluminescent layer (light-emitting layer) and the anode. As a material for the cathode, for example, a metal or metal alloy such as Li, Ca, Mg, AL, In, Cs, Mg/Ag, or LiF is preferable. As a material for the anode, a metal (e.g. Au) or another material having metallic conductivity such as, for example, an oxide (e.g. ITO: indium oxide/tin oxide) on a transparent substrate (e.g. a glass or a transparent polymer) can be used.

The purification process of the present invention may be applied not only to an electroluminescent material that is used in a light-emitting layer, but also to an electroluminescent material that is used in any other standard layer of the electroluminescent device.

As is clear from Examples, Comparative Examples, etc., the process for purifying an electroluminescent material of the present invention exhibits an excellent effect in removing impurities, and is suitable for the production of an electroluminescent material and an electroluminescent device having excellent luminescence characteristics, stability, etc.

EXAMPLES

The present invention is explained further in detail below with reference to examples, but the present invention is not limited by the examples below.

Synthetic Example 1

Synthesis of poly(9,9-di-n-octylfluorene)

A 2M aqueous solution of $K_2CO_3$ was added to a toluene solution of dicaprylmethylammonium chloride (3%), 2,7-dibromo-9,9-dioctylfluorene (0.4 mmol), 9,9-dioctylfluorene diborate (0.4 mmol), which is represented by Compound (1), and $Pd(0)(PPh_3)_4$ (0.008 mmol), and the mixture was refluxed under nitrogen for 48 hours while stirring vigorously.

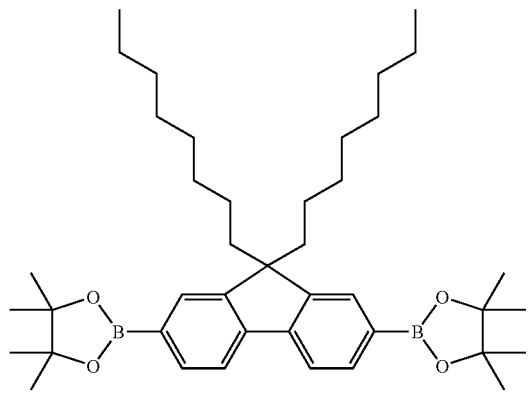

(1)

After the reaction mixture was cooled to room temperature, it was poured into methanol-water to precipitate a solid. The solid thus precipitated was filtered under suction and washed with methanol-water to give a solid. The solid thus obtained by filtration was dissolved in toluene, and the solution was poured into a large amount of methanol-acetone to precipitate a solid. The solid thus precipitated was filtered under suction and washed with methanol-acetone to give a polyfluorene. The polymer thus obtained was subjected to ICP emission spectrometry, and it was found that the Pd content was 800 ppm and the P content was 900 ppm.

The quantitative method for Pd and P by ICP emission spectrometry was as follows.

About 5 mg of the sample was weighed, sulfuric acid, nitric acid, perchloric acid, and hydrofluoric acid were added thereto, it was decomposed by heating, the decomposed substance was dissolved in diluted aqua regia to give a test sample, and measurement was carried out using an SPS3000 ICP emission spectrometer manufactured by Seiko Instruments Inc. (the same applies below).

The polymer thus obtained was a polyfluorene, which is a conjugated polymer and can be used as an electroluminescent material.

Example 1

Purification of Polyfluorene (1)

The polyfluorene (100 mg) obtained in Synthetic Example 1 was dissolved in toluene (30 mL), and the solution was washed with 1% aqueous hydrogen peroxide (30 mL) three times and then with water (30 mL) three times. The organic layer thus obtained was concentrated by a rotary evaporator. After the solid thus obtained was dissolved in toluene, the solution was passed through a silica gel column (3 cm×10 cm) using toluene as an eluent. The eluate containing the polymer was concentrated by a rotary evaporator so as to remove the solvent. The solid thus obtained was dissolved in toluene, and the solution was poured into a large amount of methanol-acetone to precipitate a solid. The solid thus precipitated was filtered under suction and washed with methanol-acetone to give a polymer. The polymer thus obtained was subjected to ICP emission spectrometry, and it was found that the Pd content was 30 ppm and the P content was 20 ppm.

Example 2

Purification of Polyfluorene (2)

Purification was carried out in the same manner as in Example 1 except that a 1% aqueous solution of OXONE was used instead of the 1% aqueous hydrogen peroxide. The polymer thus obtained was subjected to ICP emission spectrometry and it was found that the Pd content was 20 ppm and the P content was equal to or less than 10 ppm.

Comparative Example 1

Purification By Reprecipitation

The polyfluorene obtained in Synthetic Example 1 was dissolved in toluene and the solution was then poured into a large amount of methanol-acetone to precipitate a solid. The solid thus precipitated was filtered under suction and washed with methanol-acetone to give a polymer. The polymer thus obtained was subjected to ICP emission spectrometry and it was found that the Pd content was 800 ppm and the P content was 900 pm, and no effect in removing Pd or P was shown.

Examples 3 to 4 and Comparative Example 2

Preparation and Evaluation of Organic EL Device

A toluene solution (1.0 wt %) of each of the polyfluorenes obtained in Examples 1 and 2 and Comparative Example 1 was applied on a glass substrate, which had been subjected to patterning with a 2 mm width of ITO (indium tin oxide), by spin coating under a dry nitrogen atmosphere to form a luminescent polymer layer (coating thickness 70 nm). Subsequently, it was dried by heating under a dry nitrogen atmosphere on a hot plate at 80° C./5 minutes. The glass substrate thus obtained was transferred to a vacuum deposition machine, and an electrode was formed on the luminescent layer from LiF (coating thickness 10 nm) and Al (coating thickness 100 nm) in that order. The ITO/luminescent polymer layer/LiF/Al device thus obtained was connected to a power source so that a voltage was applied using the ITO as a positive electrode and the LiF/Al as a negative electrode, and the results for the luminescence starting voltage to obtain a luminance of 1 cd/m$^2$, and the power efficiency at a luminance of 100 cd/m$^2$ were as shown in Table 1.

TABLE 1

| Example | Polyfluorene | Turn on voltage (V) | Power efficiency (lm/W) |
|---|---|---|---|
| Example 3 | Example 1 | 6.0 | 0.04 |
| Example 4 | Example 2 | 6.0 | 0.05 |
| Comparative Example 2 | Comparative Example 1 | 6.5 | 0.03 |

Examples 5 to 28

Purification of Electroluminescent Material And Fabrication And Evaluation of Electroluminescent Device Purification was carried out in the same manner as in Example 2 except that the electroluminescent materials shown in Table 2 were used instead of polyfluorene; fabrication and evaluation of organic EL devices were carried out in the same manner as in Examples 3 and 4, and the results thus obtained are given in Table 2. It was confirmed in all of the organic EL devices that, compared with a case in which an unpurified electroluminescent material was used, the luminescence starting voltage decreased and the power efficiency improved.

TABLE 2

| Example | electroluminescent material | Impurity concentration (ppm) | | Turn on voltage (V) | Power efficiency (lm/W) |
|---|---|---|---|---|---|
| | | Pd | P | | |
| Example 5 | (2) (m:n = 3:2) | 40 | 40 | 4.0 | 0.97 |
| Example 6 | (3) (m:n = 1:2) | 50 | 30 | 4.0 | 0.12 |
| Example 7 | (4) (m:n = 1:1) | 60 | 40 | 6.0 | 0.24 |
| Example 8 | (5) (m:n = 3:7) | 60 | 20 | 4.0 | 1.11 |
| Example 9 | (6) (m:n = 1:2) | 50 | 50 | 5.5 | 0.85 |
| Example 10 | (7) (l:m:n = 40:7:3) | 60 | 50 | 5.5 | 0.80 |
| Example 11 | (8) (l:m:n = 40:7:3) | 70 | 40 | 5.5 | 0.42 |
| Example 12 | (9) (m:n = 4:1) | 80 | 40 | 6.5 | 0.79 |
| Example 13 | (10) (m:n = 4:1) | 50 | 30 | 4.0 | 1.22 |
| Example 14 | (11) (m:n = 4:1) | 30 | 40 | 6.5 | 0.83 |
| Example 15 | (12) (m:n = 1:9) | 70 | 40 | 6.0 | 0.41 |
| Example 16 | (13) (m:n = 1:1) | 60 | 50 | 5.0 | 0.59 |
| Example 17 | (14) (m:n = 1:4) | 40 | 20 | 4.0 | 1.28 |
| Example 18 | (15) (m:n = 1:1) | 40 | 50 | 4.0 | 0.36 |
| Example 19 | (16) (m:n = 1:4) | 80 | 40 | 4.5 | 0.77 |
| Example 20 | (17) (m:n = 1:1) | 80 | 30 | 5.5 | 0.99 |
| Example 21 | (18) (m:n = 1:4) | 30 | 20 | 4.0 | 1.43 |
| Example 22 | (19) (m:n = 1:1) | 70 | 30 | 4.5 | 0.83 |
| Example 23 | (20) (m:n = 1:4) | 70 | 40 | 4.0 | 1.12 |
| Example 24 | (21) | 50 | 20 | 9.0 | 0.02 |
| Example 25 | (22) | 60 | 10 | 6.5 | 0.19 |
| Example 26 | (23) | 40 | 20 | 8.0 | 0.05 |
| Example 27 | (24) | 70 | 40 | 7.5 | 0.07 |
| Example 28 | (25) | 50 | 20 | 8.0 | 0.05 |

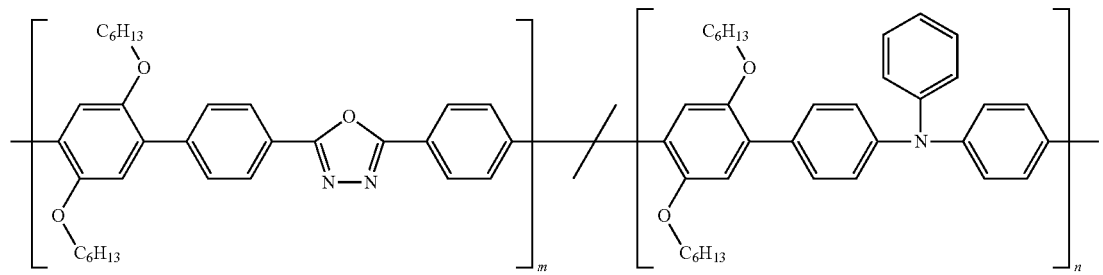

(2)

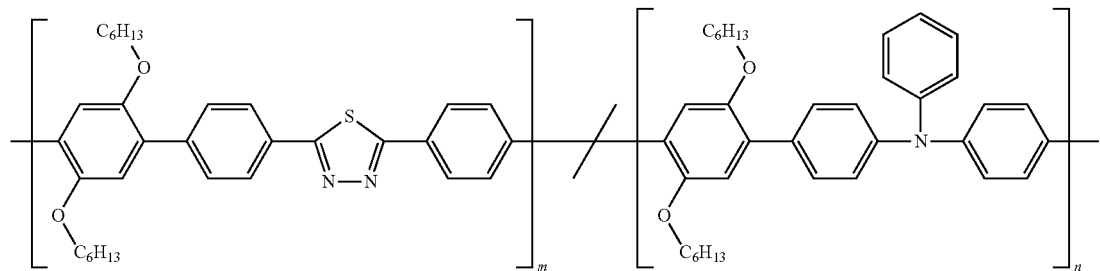
(3)
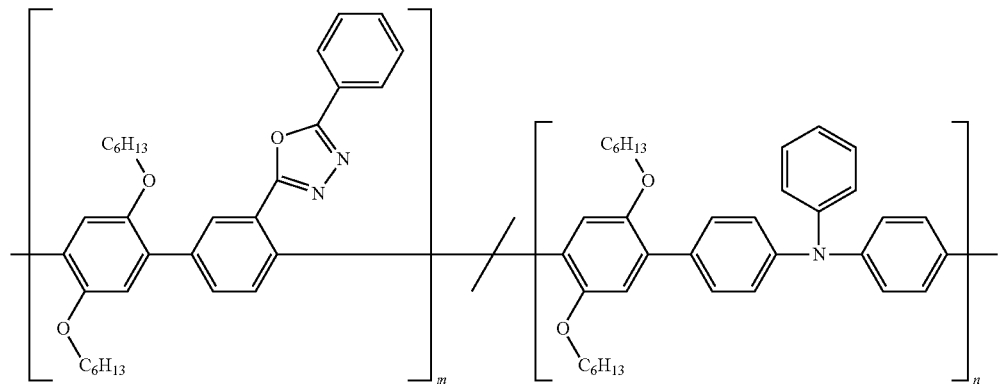
(4)
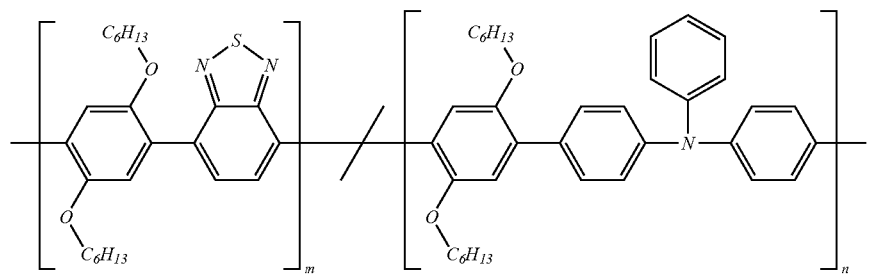
(5)
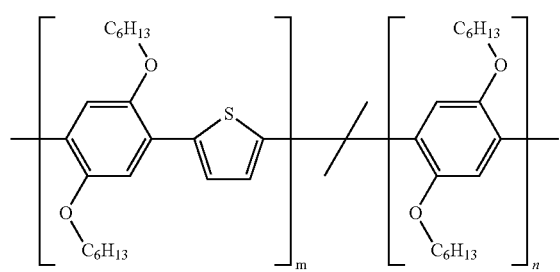
(6)

-continued
(7)
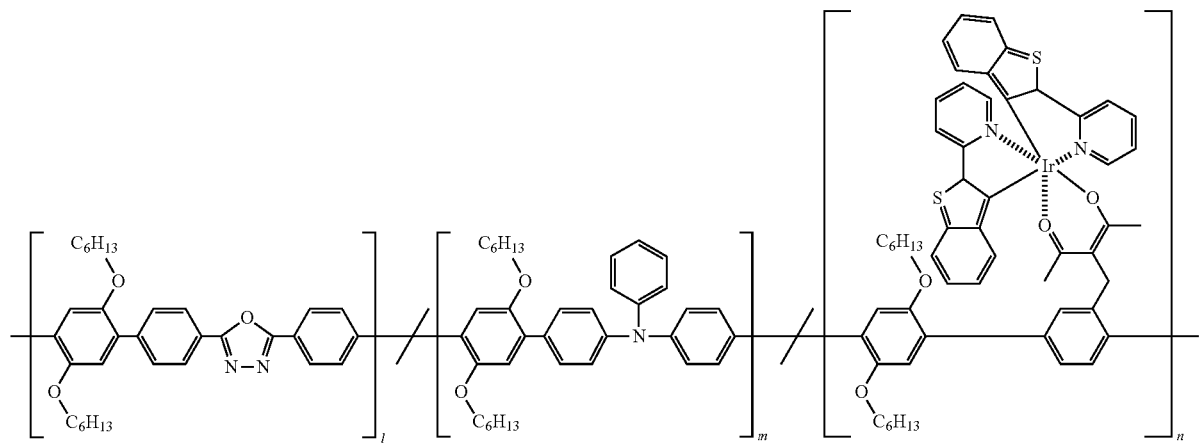
(8)
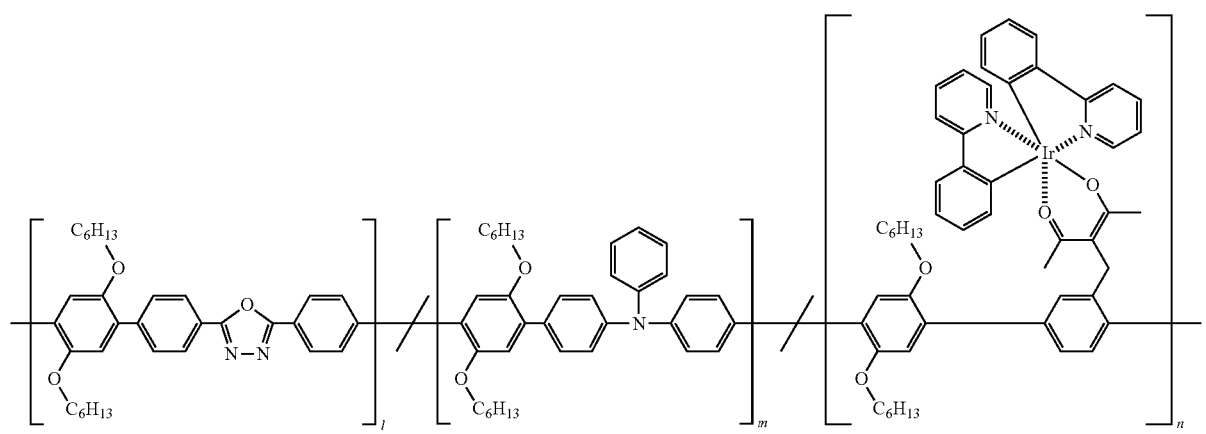
(9)
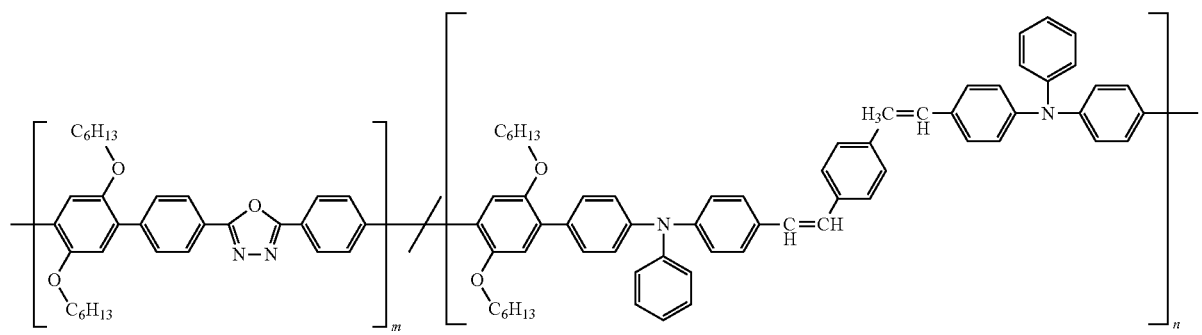
(10)
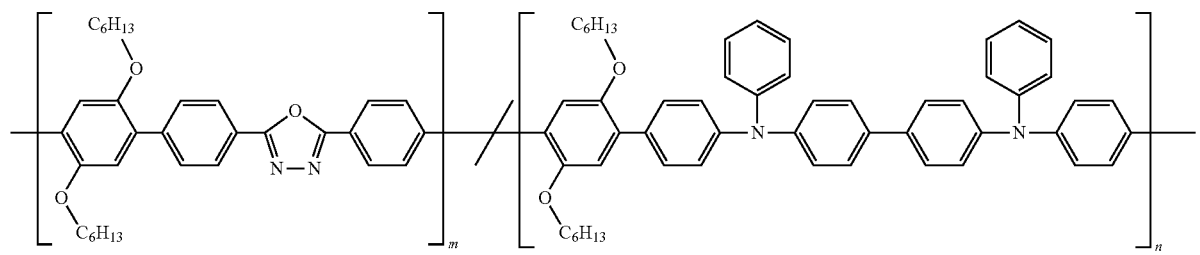

-continued
(11)
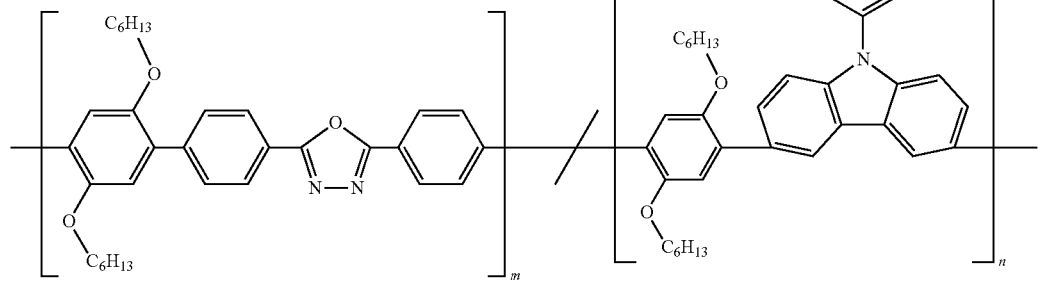
(12)
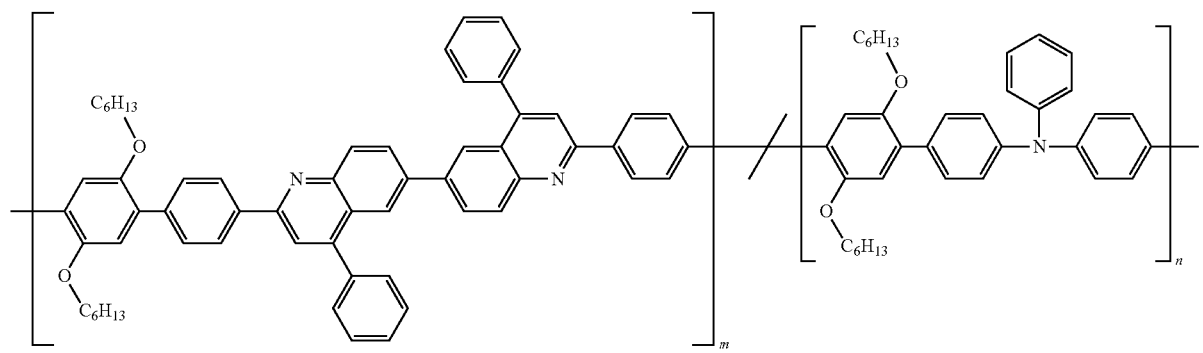
(13)
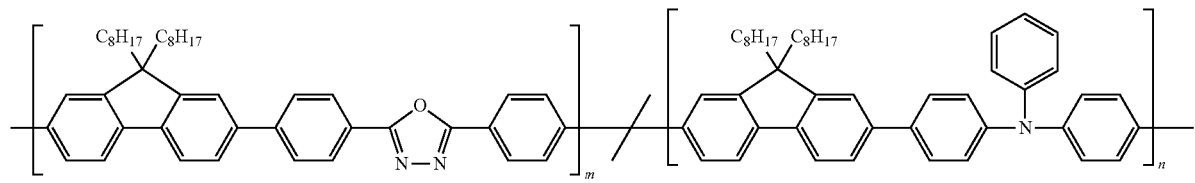
(14)
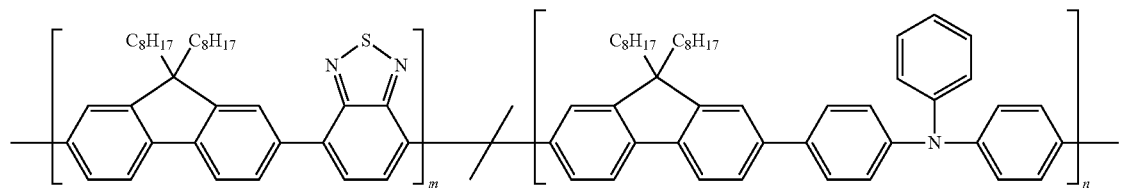
(15)
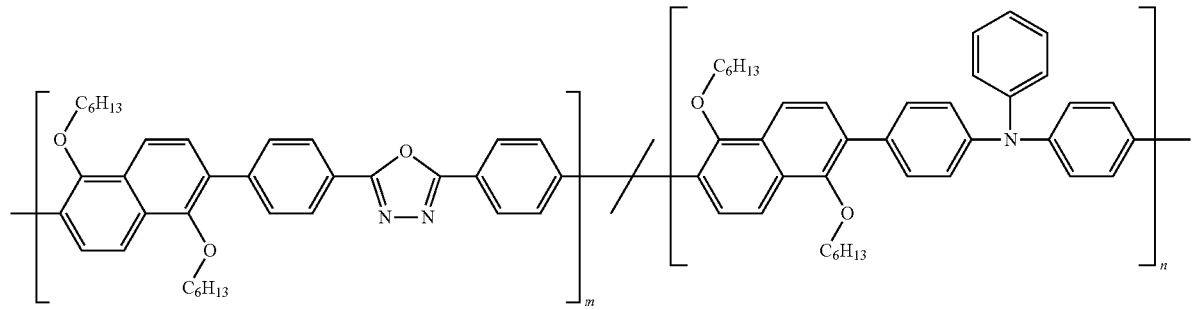

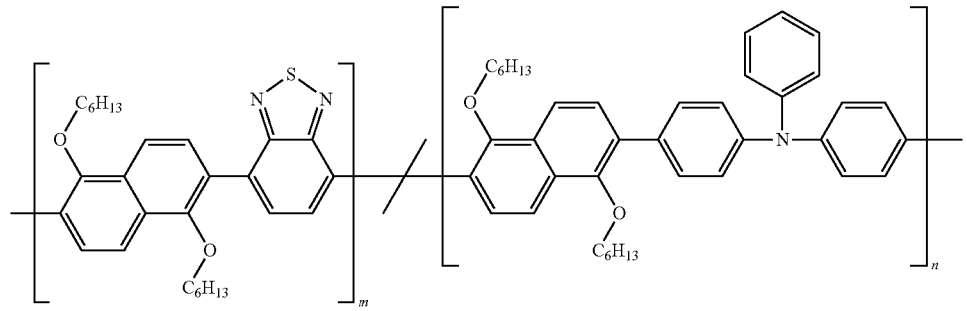
(16)
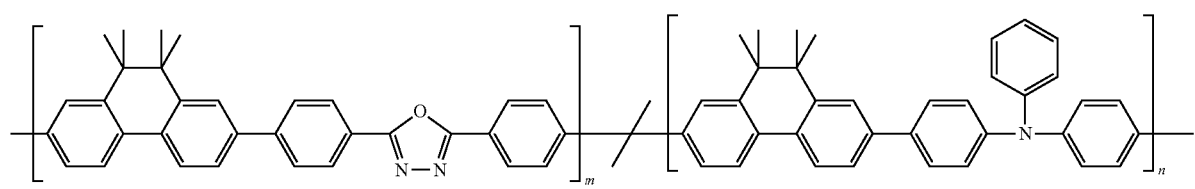
(17)
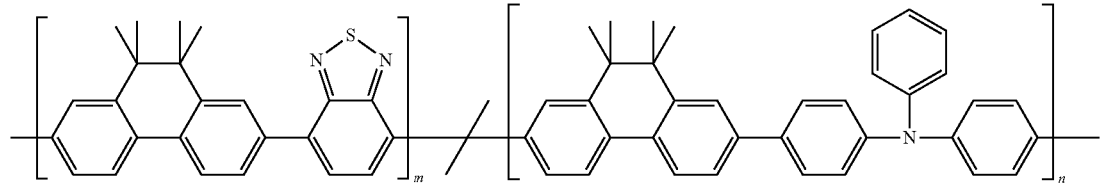
(18)
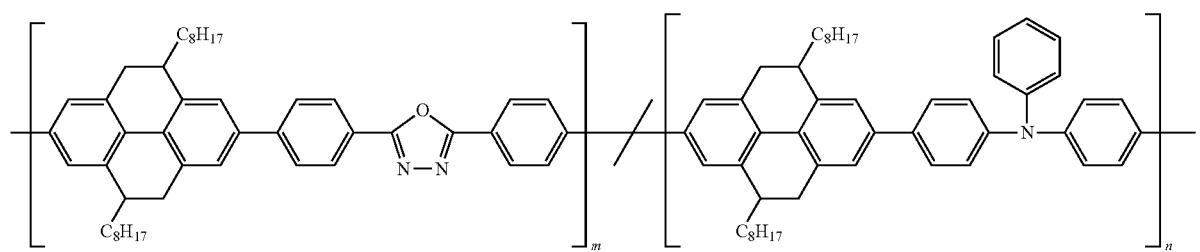
(19)
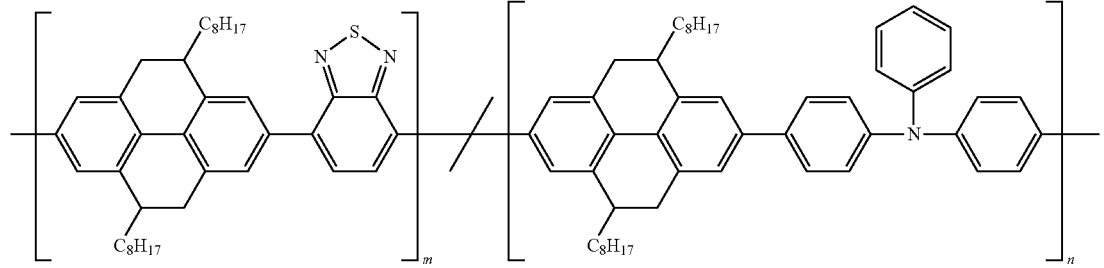
(20)

-continued
(21)
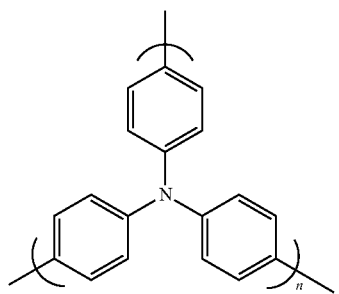
(22)
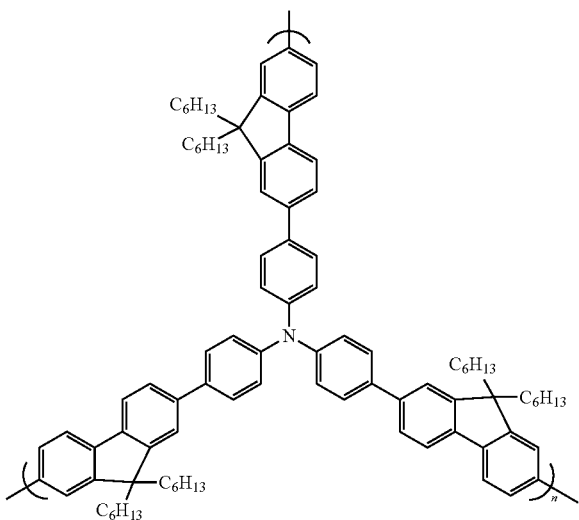
(23)
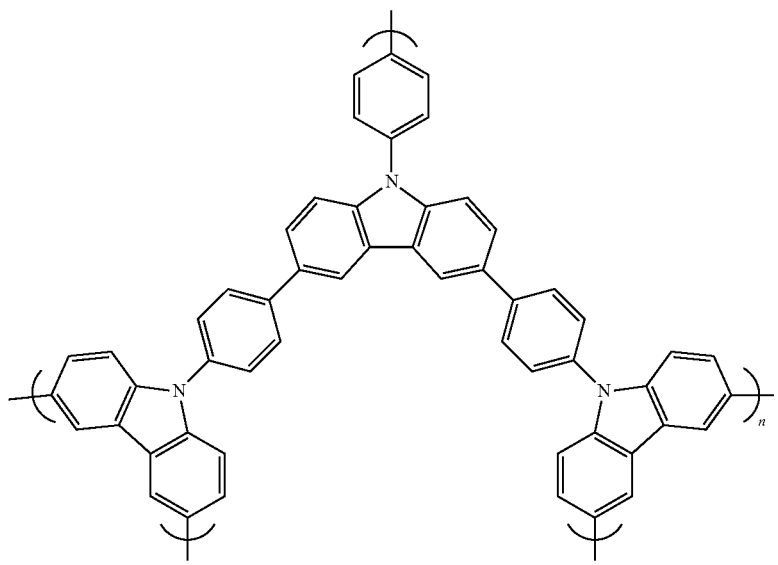
(24)
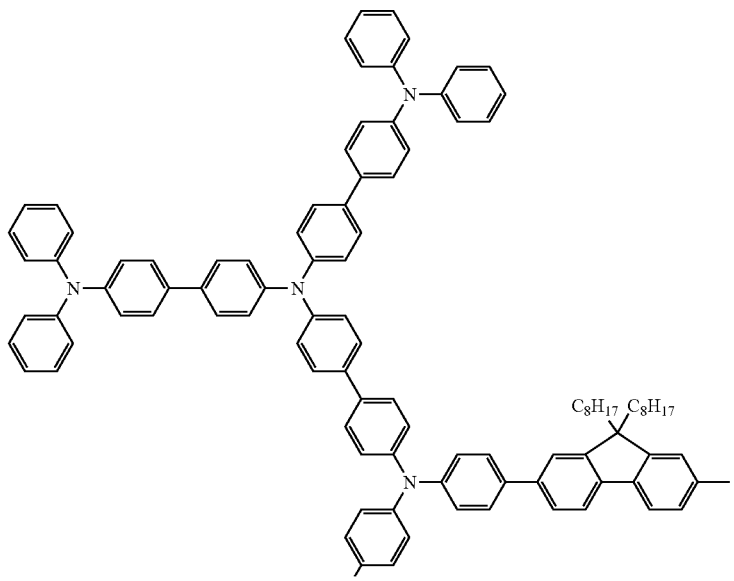

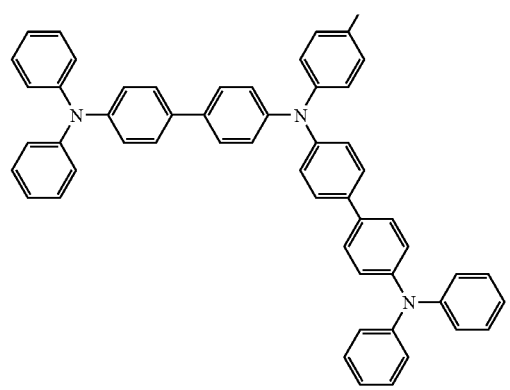
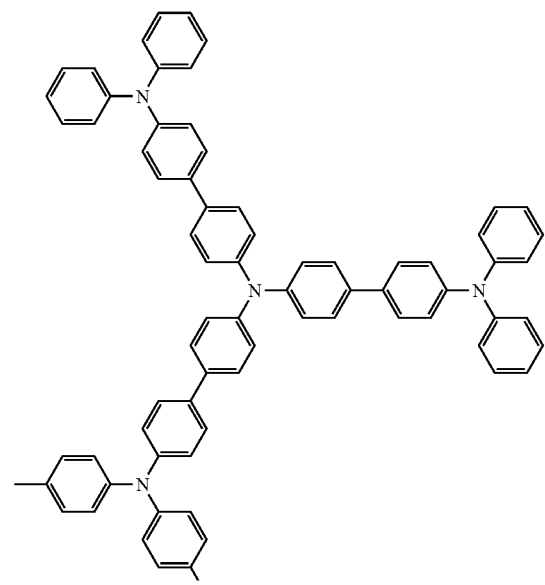
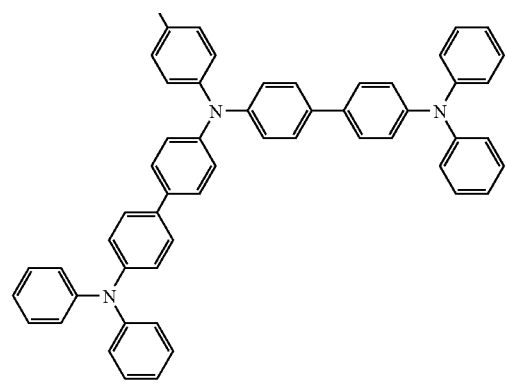

-continued
(25)
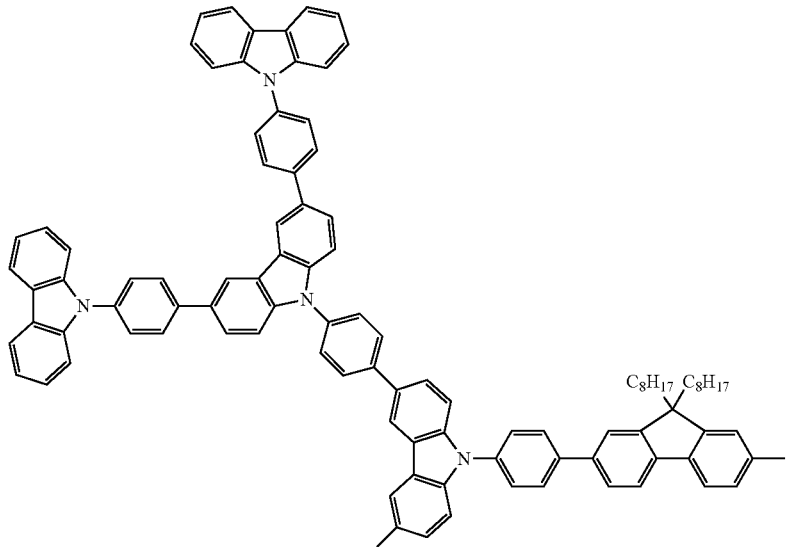
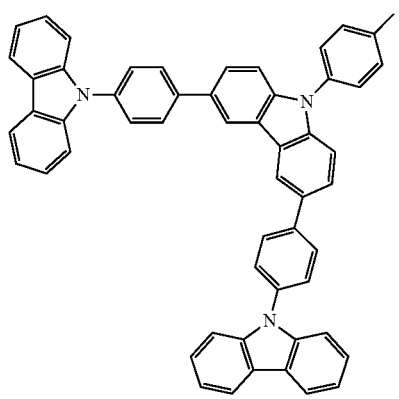
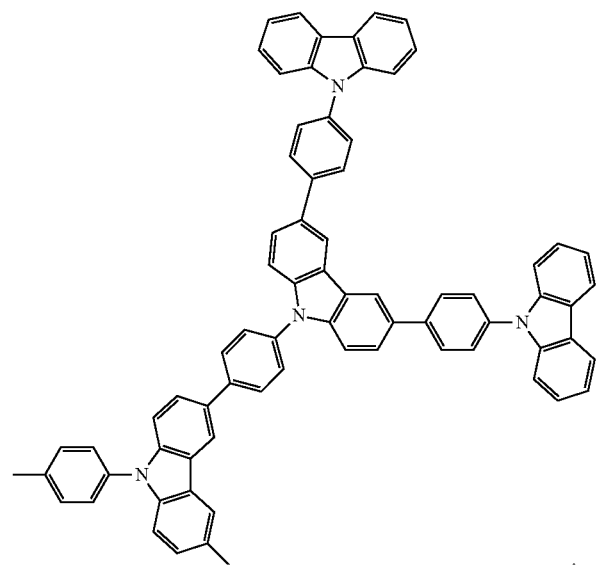

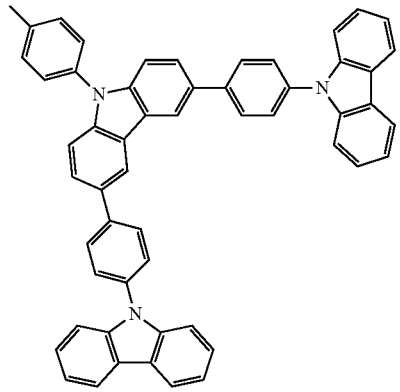

The invention claimed is:

1. A purification process for an electroluminescent material, the process comprising treating, with an oxidizing agent and then with a column, an electroluminescent material that contains Pd and/or P as impurities so as to remove the Pd and/or P,
wherein the electroluminescent material is a polymer or an oligomer.

2. The purification process for an electroluminescent material according to claim 1, wherein the electroluminescent material is synthesized using a Pd catalyst.

3. The purification process for an electroluminescent material according to claim 1, wherein the electroluminescent material is a conjugated polymer or oligomer.

4. The purification process according to claim 1, wherein the electroluminescent material is the polymer.

5. The purification process according to claim 3, wherein the electroluminescent material is the conjugated polymer.

6. The purification process for an electroluminescent material according to claim 1, wherein the oxidizing agent comprises peroxide.

7. The purification process for an electroluminescent material according to claim 1, wherein the oxidizing agent comprises peroxo acid or salt thereof.

8. The purification process for an electroluminescent material according to claim 1, wherein the oxidizing agent comprises hydrogen peroxide, a persulfate, or peracetic acid.

9. The purification process for an electroluminescent material according to claim 1, wherein the process comprising treating an electroluminescent material solution with an oxidizing agent solution.

10. The purification process for an electroluminescent material according to claim 9, wherein the oxidizing agent solution is used at a ratio by volume of 1:10 to 10:1 relative to the electroluminescent material solution.

11. The purification process for an electroluminescent material according to claim 9, wherein the concentration of the electroluminescent material in the electroluminescent material solution is set in the range of 0.01 to 10 parts by weight relative to 100 parts by weight of the solvent.

12. The purification process for an electroluminescent material according to claim 9, wherein the concentration of the oxidizing agent in the oxidizing agent solution is set in the range of 0.01 to 20 wt %.

13. The purification process for an electroluminescent material according to claim 1, wherein the oxidizing agent comprises potassium peroxymonosulfate.

14. The purification process for an electroluminescent material according to claim 1, wherein the purified electroluminescent material has Pd content of 100 ppm or less.

15. The purification process for an electroluminescent material according to claim 1, wherein the purified electroluminescent material has Pd content of 100 ppm or less and a P content of 100 ppm or less.

16. The purification process for an electroluminescent material according to claim 1, wherein the electroluminescent material is selected from the group consisting of poly(9, 9-di-n-octylfluorene) and formulae (2)-(25):

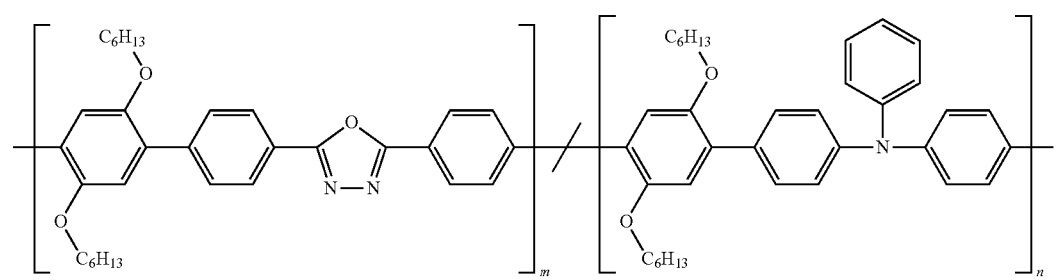

(2)

-continued
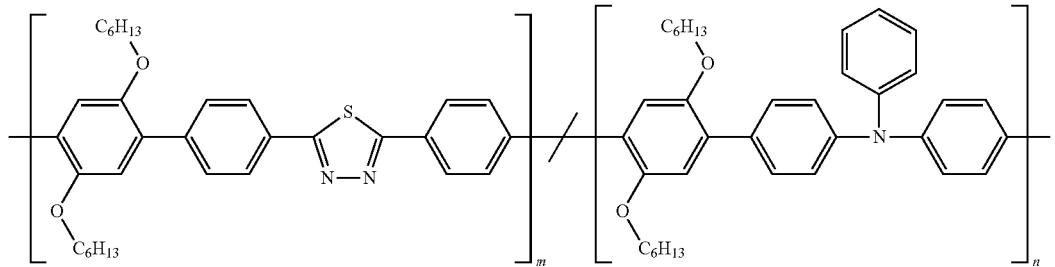
(3)
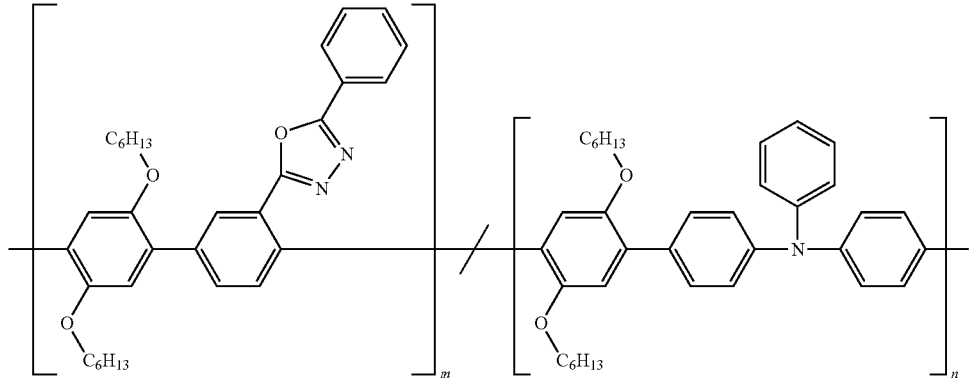
(4)
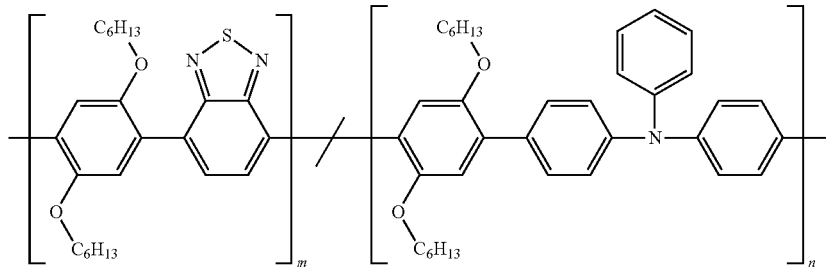
(5)
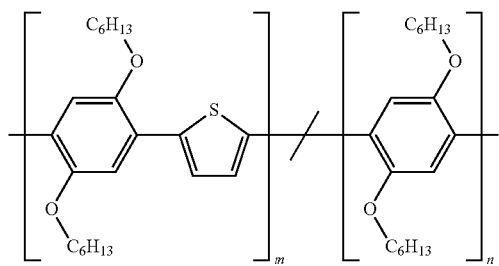
(6)
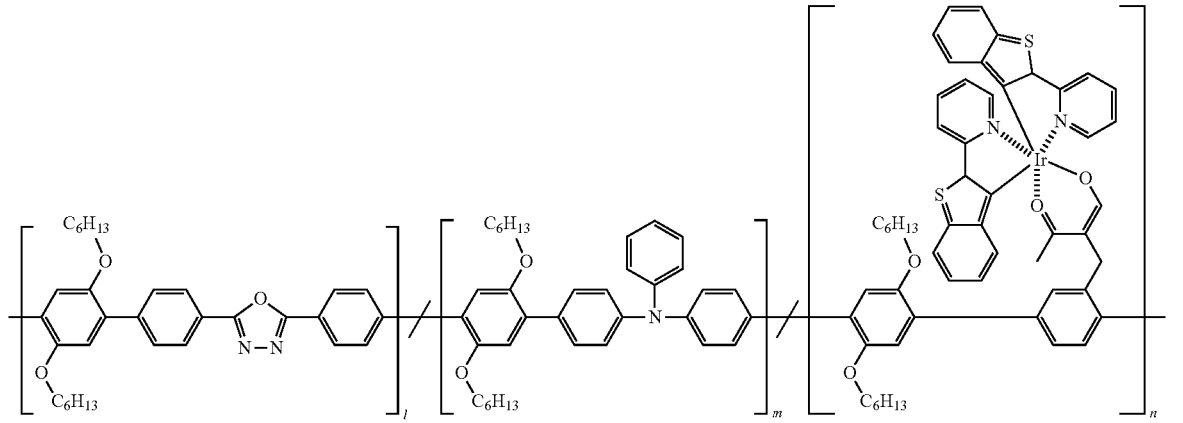
(7)

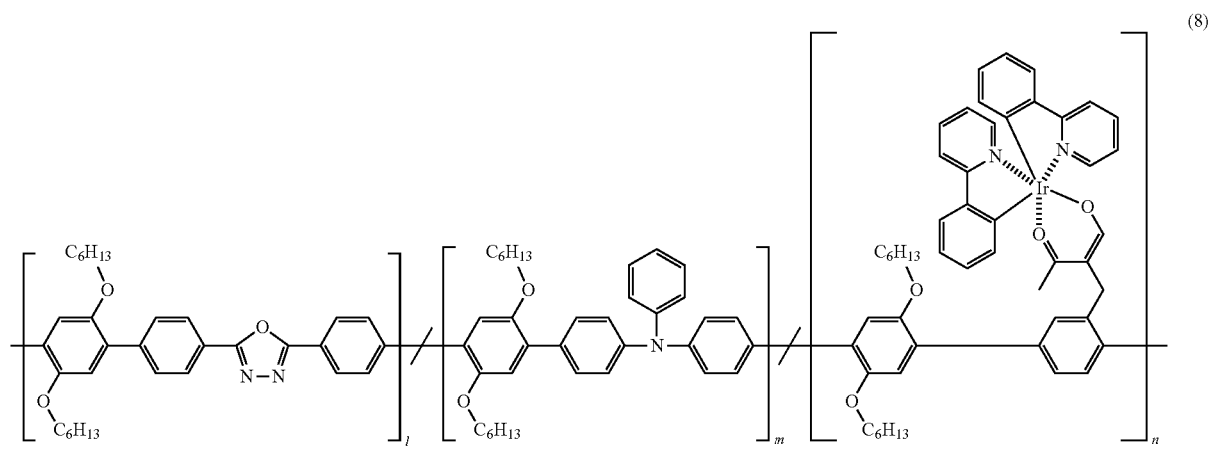
(8)
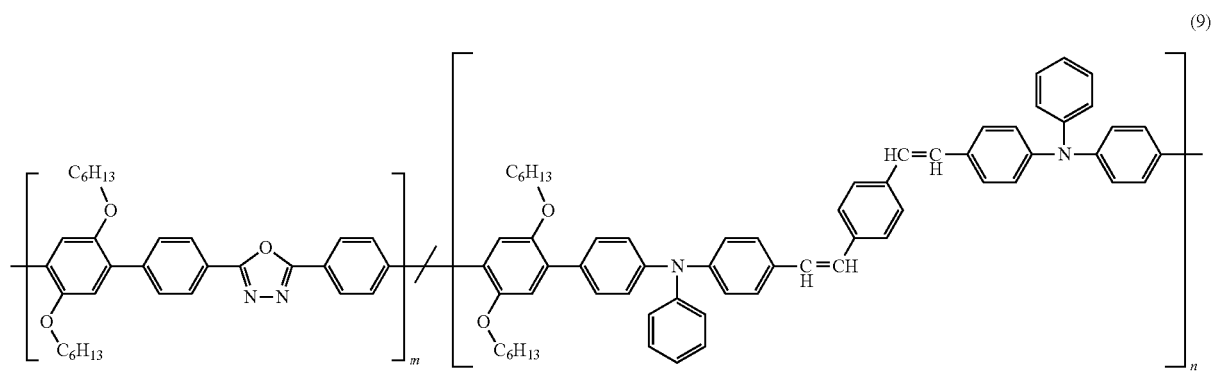
(9)
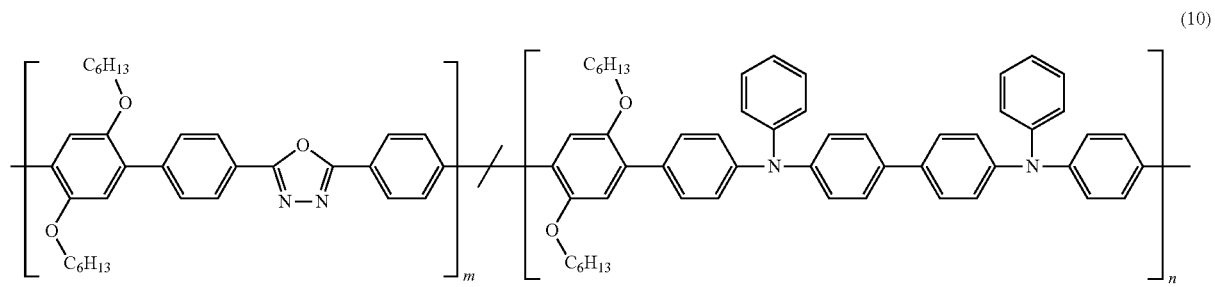
(10)
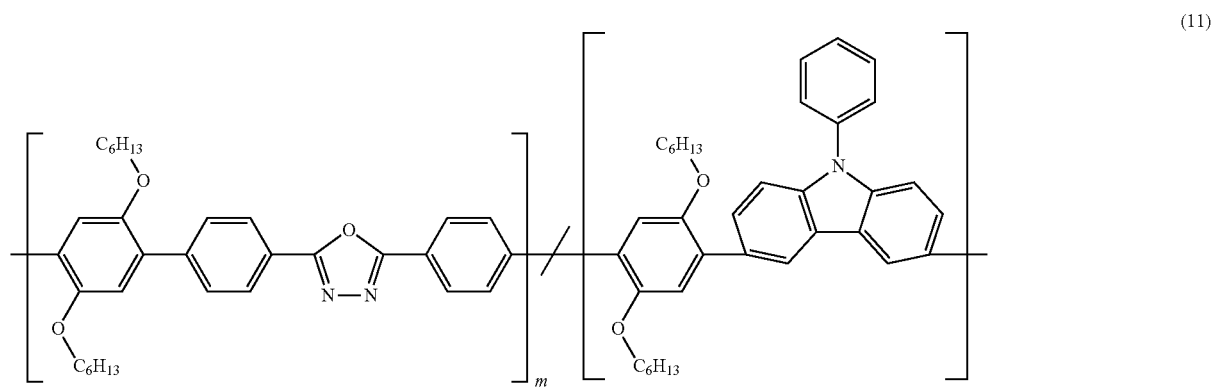
(11)

(12)
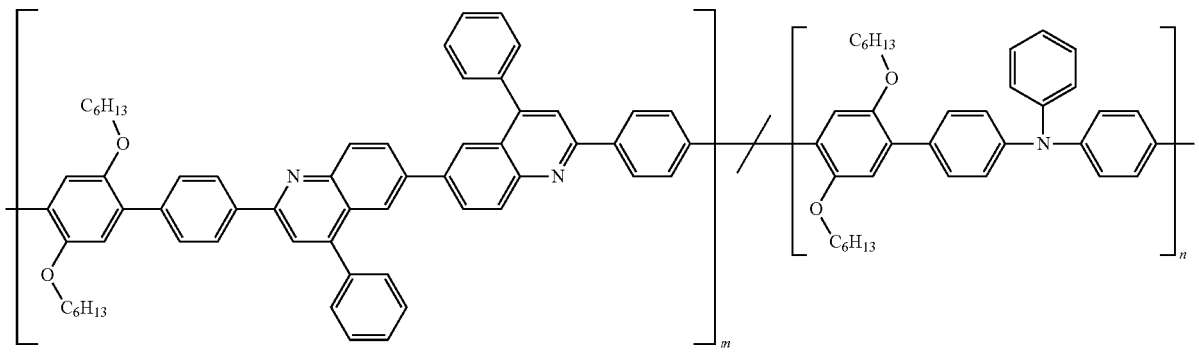
(13)
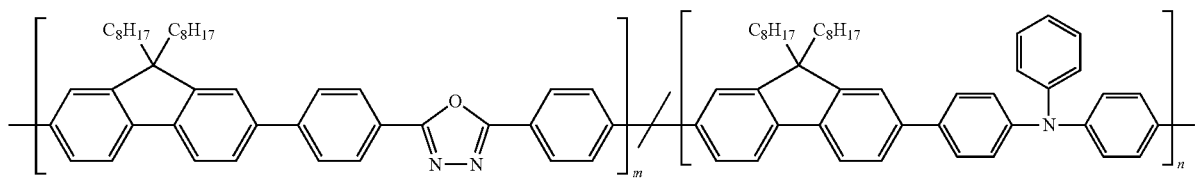
(14)
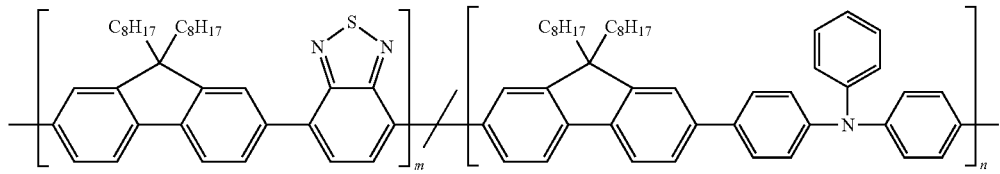
(15)
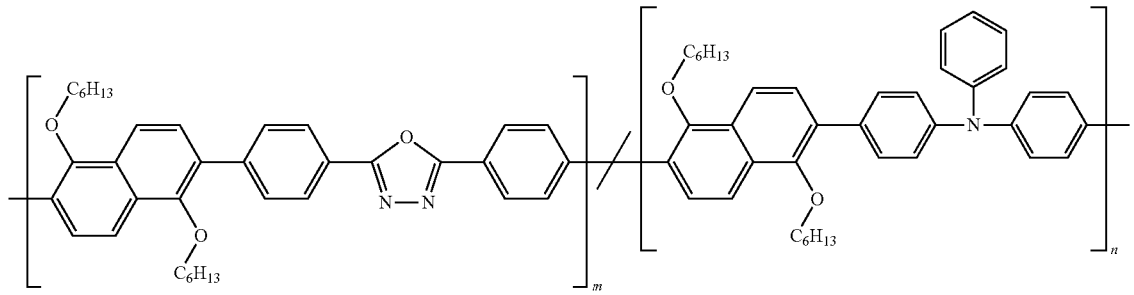
(16)
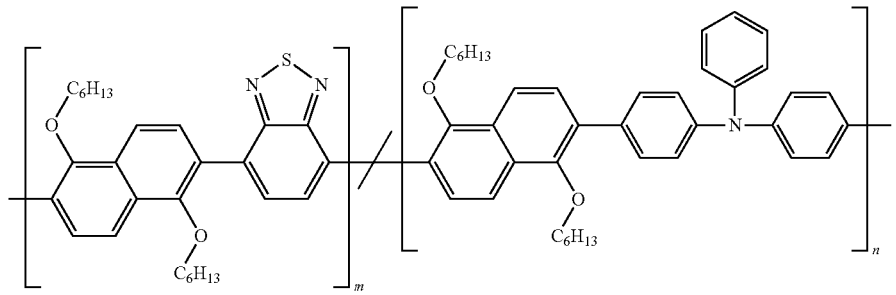
(17)
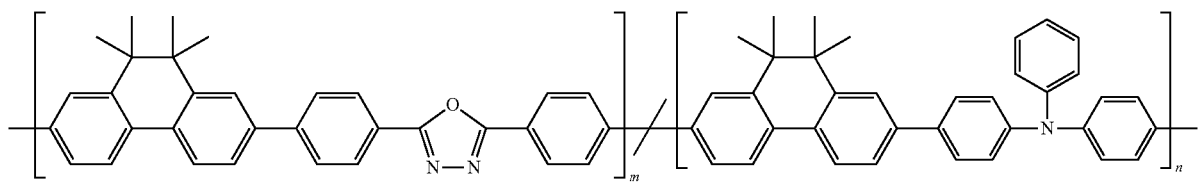

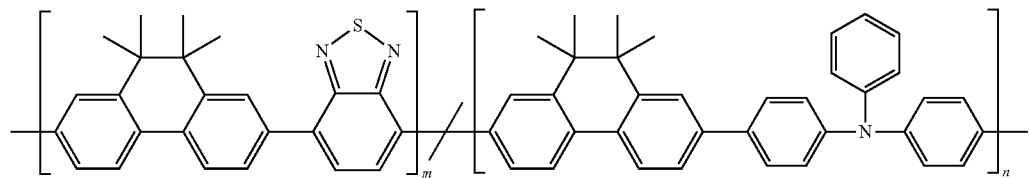
(18)
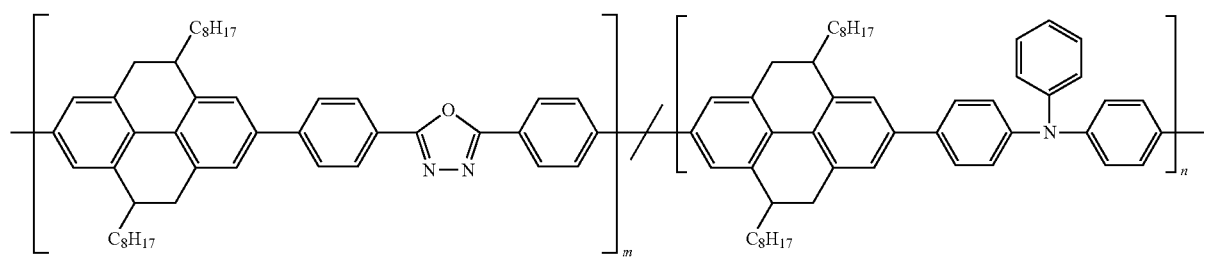
(19)
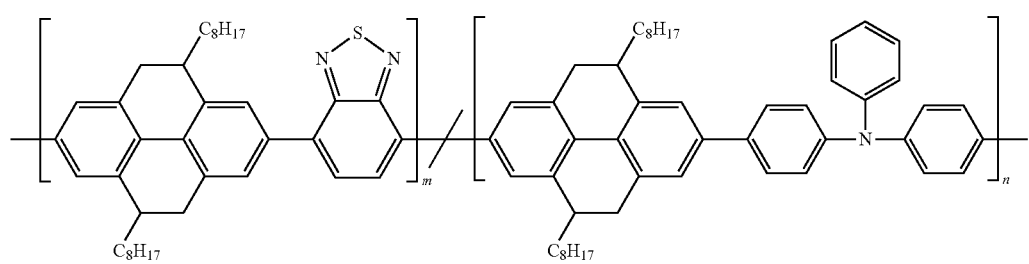
(20)
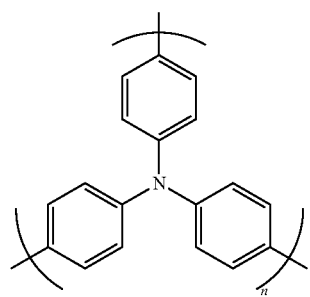
(21)

(22)
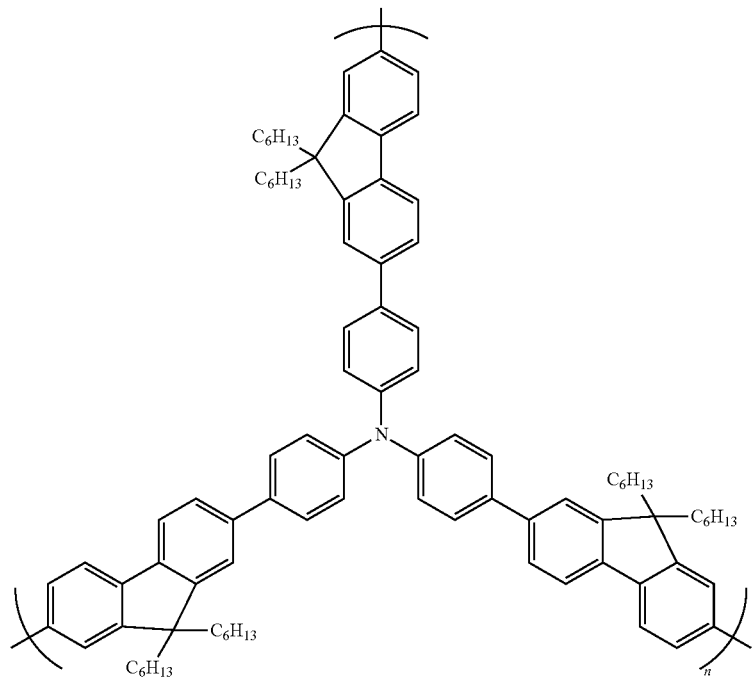
(23)
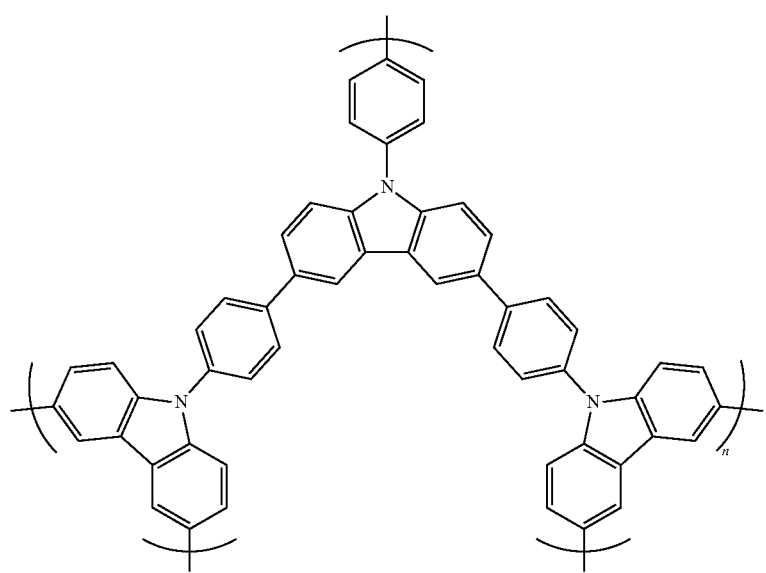

(24)
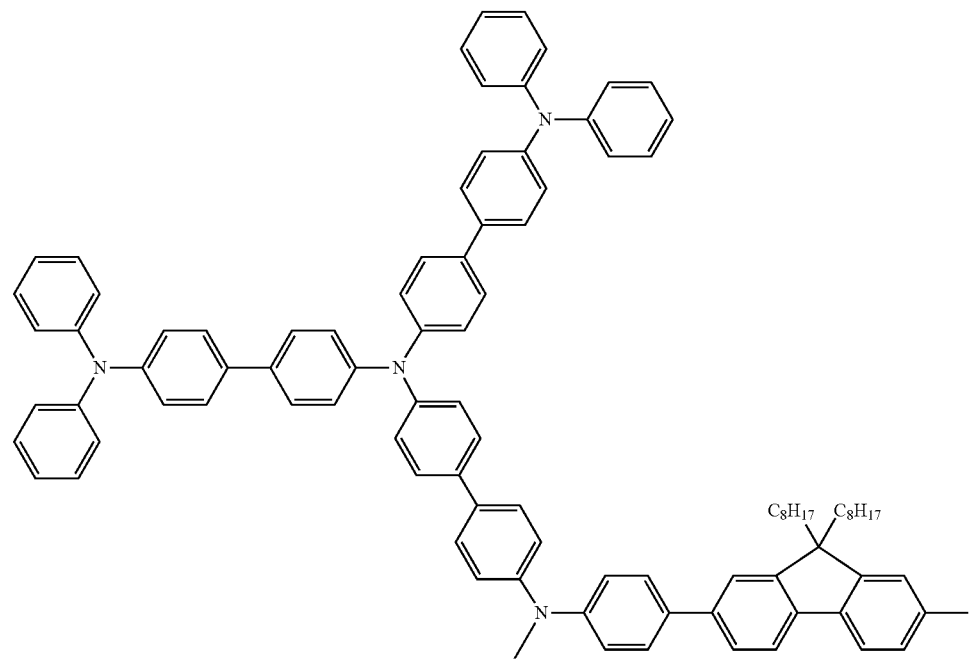
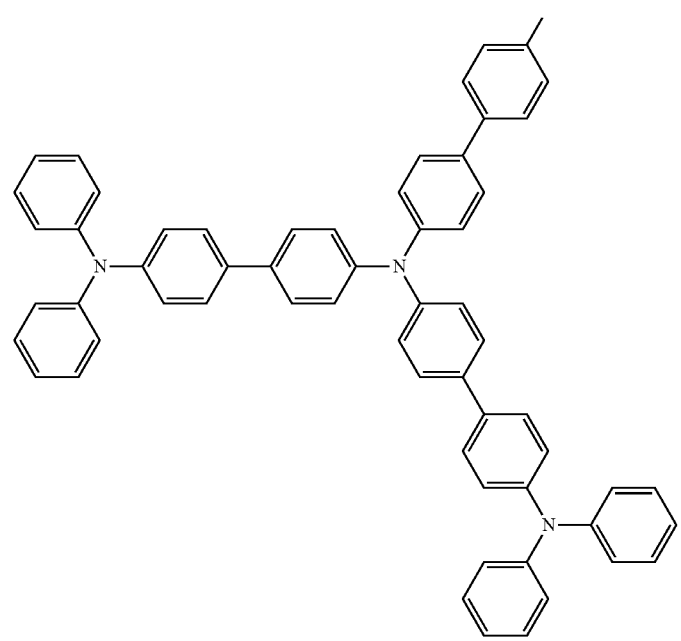

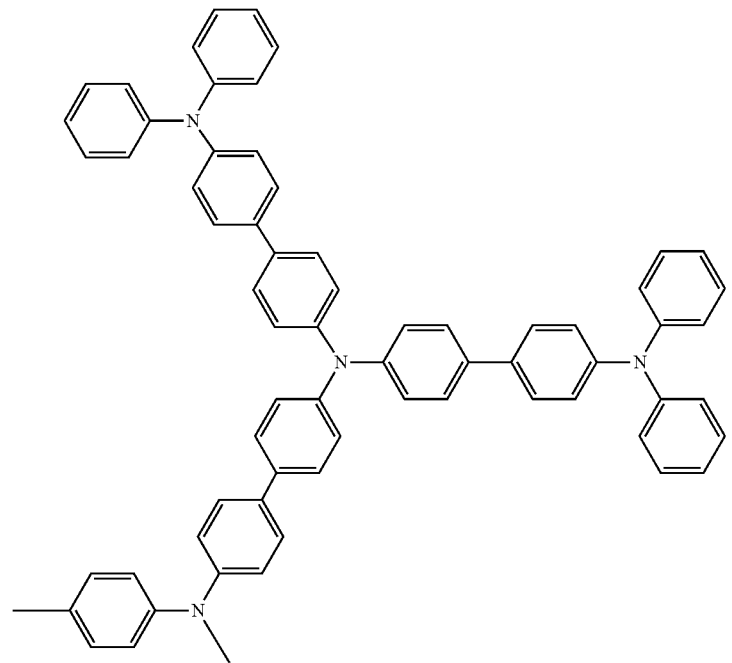
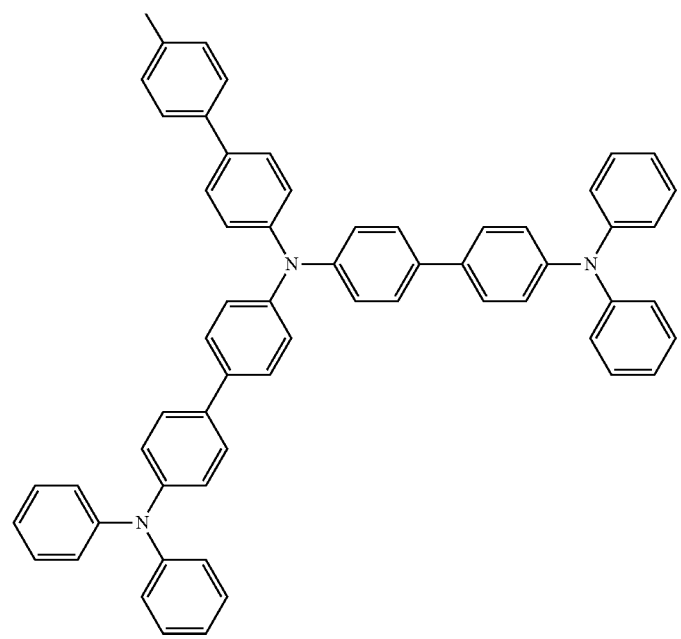
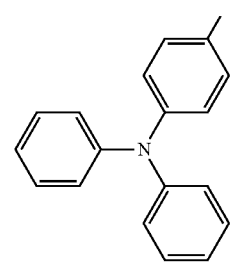

(26)
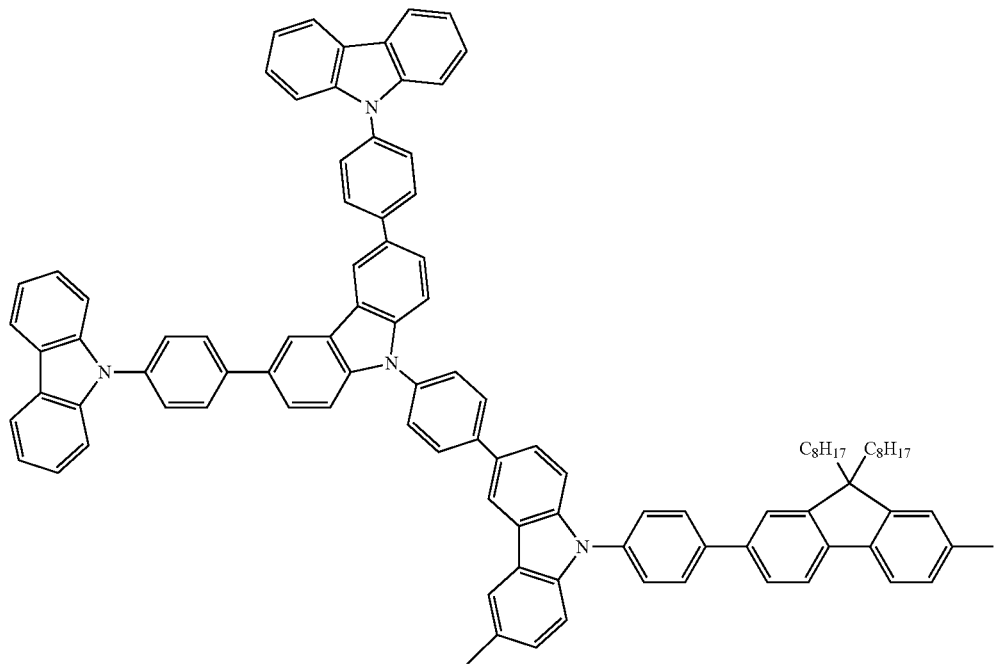
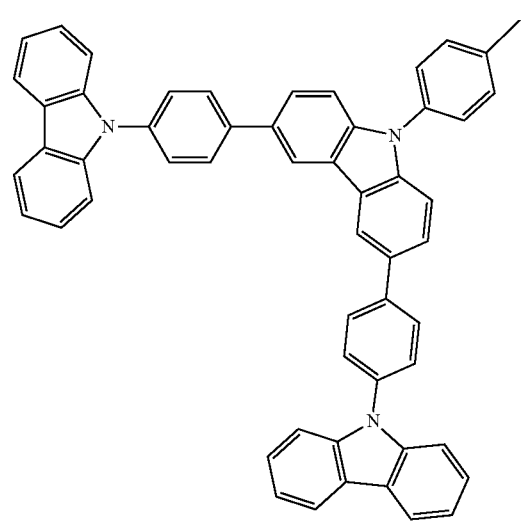

-continued
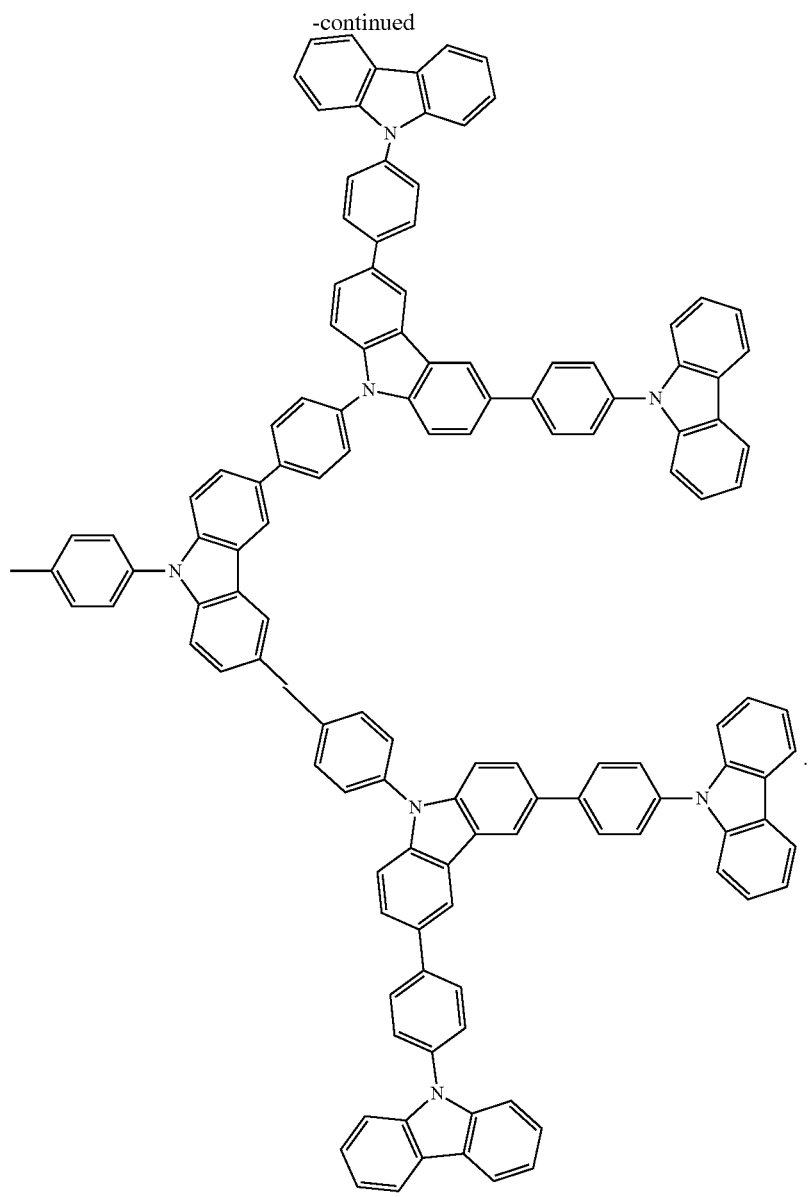
* * * * *